United States Patent
Beattie, Jr. et al.

(10) Patent No.: US 9,769,764 B2
(45) Date of Patent: *Sep. 19, 2017

(54) FACILITATION OF CONNECTIVITY AND CONTENT MANAGEMENT IN MOBILE ENVIRONMENTS

(71) Applicants: AT&T Intellectual Property I, L.P., Atlanta, GA (US); AT&T Mobility II LLC, Atlanta, GA (US)

(72) Inventors: James Gordon Beattie, Jr., Bergenfield, NJ (US); Soumyajit Chakraborty, Somerset, NJ (US); Dave Huggins, Plainfield, NJ (US); Rakhee Nair, Holmdel, NJ (US); Haywood S. Peitzer, Randolph, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,484

(22) Filed: Oct. 24, 2016

(65) Prior Publication Data

US 2017/0041883 A1 Feb. 9, 2017

Related U.S. Application Data

(63) Continuation of application No. 13/606,567, filed on Sep. 7, 2012, now Pat. No. 9,503,323.

(51) Int. Cl.
*G06F 15/177* (2006.01)
*H04W 52/24* (2009.01)
(Continued)

(52) U.S. Cl.
CPC ........ *H04W 52/241* (2013.01); *H04B 17/336* (2015.01); *H04L 41/0816* (2013.01);
(Continued)

(58) Field of Classification Search
CPC ... H04L 41/0816; H04L 41/083; H04L 67/22; H04L 43/0888; H04W 4/02
See application file for complete search history.

(56) References Cited

U.S. PATENT DOCUMENTS 8,005,891 B2 8/2011 Knowles et al.
8,176,176 B1 5/2012 Chan
(Continued)

OTHER PUBLICATIONS

Office Action for U.S. Appl. No. 13/606,567 dated Sep. 3, 2015, 30 pages.
(Continued)

*Primary Examiner* — Richard G Keehn
(74) *Attorney, Agent, or Firm* — Amin, Turocy & Watson, LLP

(57) ABSTRACT

Connectivity and/or content management in mobile networks is provided. Information associated with a mobile device of a plurality of mobile devices is determined. In various embodiments, the information can be current or past usage or travel pattern information for the mobile device. The mobile device is configured in association with delivery of content. The configuration is based, at least, on the information associated with the mobile device. The mobile device is configured to request accelerated content delivery if the mobile device is located within a good coverage area, and to request connection re-establishment priority if the mobile device is approaching or located within a poor coverage area or a handoff area.

20 Claims, 10 Drawing Sheets

(51) Int. Cl.
*H04L 29/08* (2006.01)
*H04L 12/24* (2006.01)
*H04B 17/336* (2015.01)
*H04W 52/44* (2009.01)
*H04W 76/02* (2009.01)
*H04W 4/02* (2009.01)
*H04W 4/00* (2009.01)
*H04L 12/26* (2006.01)

(52) U.S. Cl.
CPC .............. *H04L 43/16* (2013.01); *H04L 67/22* (2013.01); *H04W 4/027* (2013.01); *H04W 4/028* (2013.01); *H04W 52/44* (2013.01); *H04W 76/028* (2013.01); *H04L 41/083* (2013.01); *H04L 43/0888* (2013.01); *H04W 4/001* (2013.01); *H04W 4/02* (2013.01)

(56) References Cited

U.S. PATENT DOCUMENTS

| | | | |
|---|---|---|---|
| 2003/0144008 A1* | 7/2003 | Rehkopf | H04W 4/02 455/456.6 |
| 2007/0195742 A1* | 8/2007 | Erdman | H04L 47/10 370/338 |
| 2008/0117871 A1* | 5/2008 | Olexa | H04B 7/12 370/329 |
| 2009/0193097 A1 | 7/2009 | Gassewitz et al. | |
| 2010/0036659 A1* | 2/2010 | Haulick | G10L 21/0208 704/226 |
| 2010/0076994 A1 | 3/2010 | Soroca et al. | |
| 2010/0173681 A1* | 7/2010 | Revels | G06F 17/3087 455/573 |
| 2010/0222023 A1* | 9/2010 | Aoyama | H04W 76/021 455/411 |
| 2011/0059749 A1* | 3/2011 | Hefner | H04W 4/02 455/456.1 |
| 2011/0231483 A1 | 9/2011 | Derraugh et al. | |
| 2011/0258049 A1* | 10/2011 | Ramer | G06F 17/30867 705/14.66 |
| 2012/0114030 A1* | 5/2012 | Yue | H04L 1/1819 375/227 |
| 2012/0117240 A1* | 5/2012 | Omar | H04L 29/06 709/226 |
| 2012/0289275 A1* | 11/2012 | Li | H04B 7/0626 455/513 |
| 2012/0300622 A1 | 11/2012 | Kruglick | |
| 2013/0016666 A1* | 1/2013 | Chen | H04W 72/1231 370/329 |
| 2015/0230101 A1* | 8/2015 | Li | H04W 24/06 370/254 |

OTHER PUBLICATIONS

Office Action for U.S. Appl. No. 13/606,567 dated Jul. 15, 2015, 32 pages.
Office Action for U.S. Appl. No. 13/606,567 dated Jan. 29, 2016, 34 pages.

\* cited by examiner

FACILITATION OF CONNECTIVITY AND CONTENT MANAGEMENT IN MOBILE ENVIRONMENTS

RELATED APPLICATION

The subject application is a continuation of, and claims priority to, U.S. patent application Ser. No. 13/606,567 (now U.S. Pat. No. 9,503,323), filed Sep. 7, 2012, and entitled "FACILITATION OF CONNECTIVITY AND CONTENT MANAGEMENT IN MOBILE ENVIRONMENTS." The entirety of the aforementioned application is hereby incorporated by reference herein.

TECHNICAL FIELD

The subject disclosure relates to wireless communications and, more particularly, to various embodiments that facilitate connectivity and content management in mobile environments.

BACKGROUND

Users of mobile devices frequently transit the same geographical areas. Further, the users frequently transit these geographical areas while performing the same types of activities as those activities performed in the past in those geographical areas. For example, a user may frequently telephone, browse the Internet, chat or watch a video while traveling from one particular location to another particular location. Further, repeated service interruption in the same geographical areas for days, months or years can be frustrating for consumers and lead to system inefficiency.

DETAILED DESCRIPTION

Figure 1:
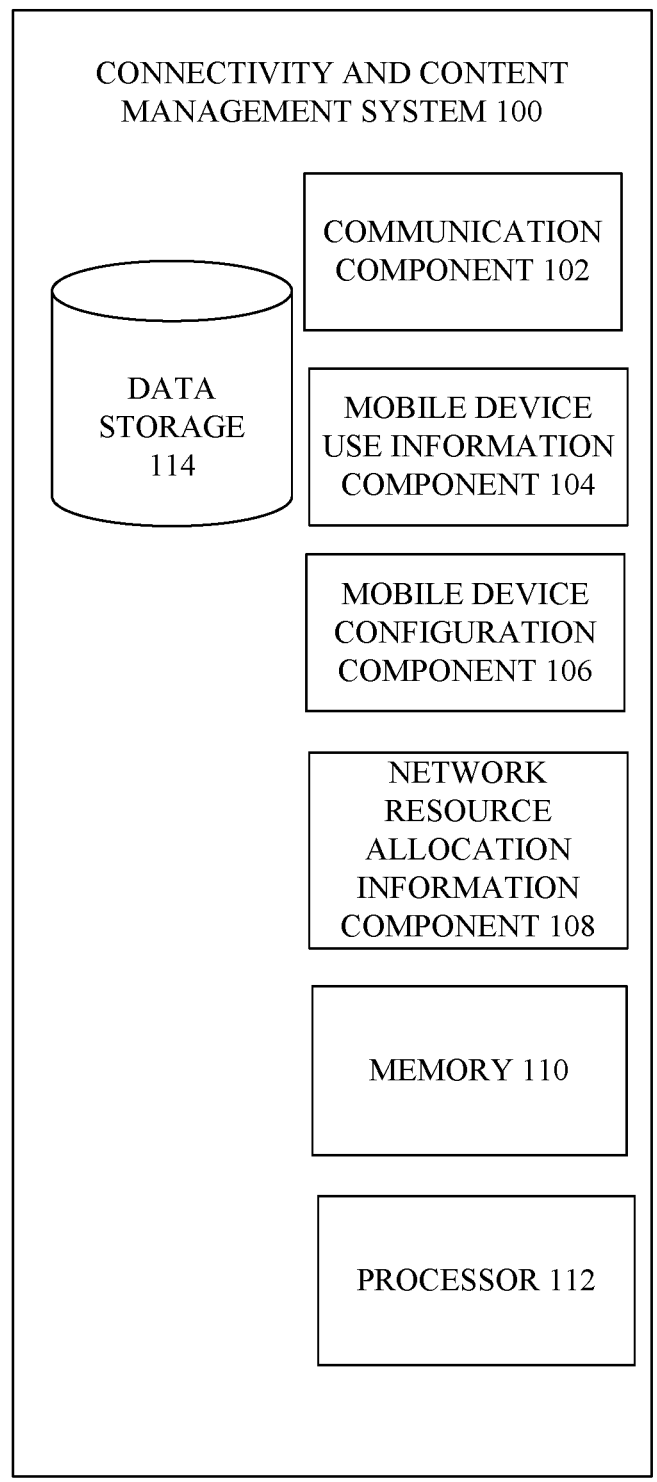
FIG. 1 illustrates an example system that facilitates connectivity and content management in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

When a mobile device consistently experiences interruptions in voice or data service when traveling through a particular area, and the user of the mobile device has indicated the location of the particular area, future service interruption (e.g., call drop, cessation of streaming media) should be avoided or minimized. In some cases, the likelihood of future service interruption can be reduced by analyzing overall mobile device population in the source and destination sectors and throttling back on the resources allocated to each mobile device for a period of time when demand conditions appear to be similar to those previously noted during or preceding service interruption.

Further, mobile devices frequently travel through the same geographical areas or physical spaces, often while engaging in the same activities (e.g., phoning, browsing, chatting or watching a video). Accordingly, past behavior can be a good indicator of future behavior. Therefore, over a period of time, the actual usage and travel patterns for mobile devices can be documented and profiled in the mobile device and/or in the network. Once this behavioral reference data has been collected for the mobile device (and, in some cases, for other mobile devices), then the mobile device can be configured to request accelerated content delivery while in a good coverage area and to request connection re-establishment priority when approaching and traveling through an area of poor coverage or an area associated with call hand off.

To further improve reliability, the request from the mobile device can be used to drive adjustments to the network to extend the coverage for the users for a period of time.

Various embodiments described herein can facilitate connectivity and/or content management in mobile environments. In one or more embodiments, a method can include: determining, by a system including a processor, information associated with a mobile device of a plurality of mobile devices; and configuring, by the system, of the mobile device in association with delivery of content based, at least, on the information associated with the mobile device.

In one or more embodiments, a tangible computer-readable storage medium can store computer-executable instructions that, in response to execution, cause a system including a processor to perform operations. The operations can include: determining mobile device use information for a mobile device of a plurality of mobile devices; facilitating generation of a configuration of the mobile device based, at least, on the mobile device use information and use information for another mobile device of the plurality of mobile devices; and receiving a request associated with content delivery from the mobile device based, at least, on the configuration of the mobile device.

In one or more embodiments, a system can include a memory that stores computer-executable instructions, and a processor, communicatively coupled to the memory, that facilitates execution of computer-executable instructions to: determine information associated with a behavior of a first mobile device of a plurality of mobile devices; configure a second mobile device of the plurality of mobile devices to request a priority for re-establishment of a disconnected connection of the second mobile device based, at least, on the information associated with the behavior of the first one mobile device and a first predefined condition of a network with which the second mobile device is associated; and configure the second mobile device to request accelerated content delivery at a first speed based, at least, on the information associated with the behavior of the first mobile device and a second predefined condition of the network with which the second mobile device is associated, wherein the first speed is faster than a second speed, the second speed being associated with the speed of content delivery prior to the request for the accelerated content delivery of the first speed.

Accordingly, one or more of the embodiments can provide speed and/or reliability of delivery of services provided over wireless channels. A scalable management framework can also be employed to enhance content management.

FIG. 1 illustrates an example system that facilitates processing for connectivity and content management in accordance with embodiments described herein. The connectivity and content management system 100 can include a communication component 102, a mobile device use information component 104, a mobile device configuration component 106, a network resource allocation information component 108, memory 110, a processor 112 and/or data storage 114. In some embodiments, one or more of the communication component 102, mobile device use information component 104, mobile device configuration component 106, network resource allocation information component 108, memory 110, processor 112 and/or data storage 114 can be communicatively or electrically coupled to one another to perform one or more functions of the connectivity and content management system 100.

The communication component 102 can transmit and/or receive information to and/or from one or more mobile devices and/or a network resource allocation information component that can control the allocation of connections or sessions available for the one or more mobile devices. The information transmitted from or received by the communication component 102 can include, but is not limited to, actual travel usage, travel pattern information and/or configuration information for the one or more mobile devices.

The mobile device use information component 104 can determine and/or store mobile device use information for one or more mobile devices. For example, the mobile device use information can be stored in the one or more mobile devices as a profile for the one or more mobile devices. In some embodiments, the mobile device use information is accessible to the one or more mobile devices in lieu of being stored in the one or more mobile devices.

In some embodiments, the mobile device use information can include, but is not limited to, information indicative of past or current actual usage or travel pattern information for the one or more mobile devices.

Actual usage information can include, but is not limited to, a type of traffic being transmitted to or received from the mobile devices, active/idle behavior (e.g., time during which a mobile device is active or idle), duration of activity and/or call drop time period, frequency, location. For example, actual usage information can include information indicative of mobile device A being active from 5:30-6:30 p.m. and 7:30-9:30 p.m. Monday through Friday, and being idle 9:30 p.m.-6:30 a.m. Monday through Friday. As another example, actual usage information can include information indicative of mobile device A being engaged in voice communications from 5:30-6:30 p.m. Monday through Friday and being engaged in downloading videos from 7:30-9:30 p.m. Monday through Friday. As yet another example, actual usage information can be information indicative of the occurrence of a call drop for mobile device A between 5:45-6:00 p.m. on Fridays.

Travel pattern information can include geographical locations traversed and/or corresponding time of travel for a mobile device. For example, travel pattern information can include information indicative of mobile device A traveling from point A to point B every Wednesday.

The mobile device configuration component 106 can determine information with which to configure one or more mobile devices. The information with which to configure a mobile device can be based on the mobile device use information. For example, the mobile device configuration component 106 can determine information with which to configure a first mobile device based on mobile device use information associated with the first mobile device and/or based on mobile device use information associated with other mobile devices.

In some embodiments, the mobile device can be configured to perform one or more operations. For example, the mobile device can be configured to transmit a request for accelerated content delivery and/or a request for connection re-establishment priority. In various embodiments, accelerated content delivery can include content delivery at a speed faster than the speed of content delivery immediately prior to the mobile device transmitting the request for accelerated content delivery, content delivery of a predefined speed, content delivery of a speed that is a predefined amount greater than the speed of content delivery in the past, current speed of content delivery or the like. In various embodiments, the request for connection re-establishment priority can include a request for priority in re-establishment of a disconnected connection of the mobile device.

The mobile device can be configured to transmit one or both of these different requests based on mobile device use information and/or based on past or current conditions of the coverage area that the mobile device is approaching, traversing or leaving. For example, in some embodiments, the mobile device configuration component 106 can transmit information to a mobile device to configure the mobile device to request connection re-establishment priority. A request for connection re-establishment priority can be a request for a BS, for example, to prioritize re-establishment of the connection with the mobile device (in the event that connectivity is lost). The re-establishment of the connection can be assigned a priority that is higher than a similar request from another mobile device, for example, or higher than a different request from the same or another mobile device. The request for connection re-establishment priority can be initiated based on the occurrence of predefined conditions of the coverage area and/or based on dynamic conditions of the coverage area. These conditions can be updated from time to time.

In various different embodiments, the predefined condition for requesting connection re-establishment priority can be (or be associated with) a particular value of the signal-to-noise ratio (SNR) (e.g., SNR less than 20 decibels (dB)), signal power, signal quality and/or carrier-to-interference (C/I) ratio on the uplink and/or the downlink in a coverage area. In various embodiments, the predefined condition for requesting connection re-establishment priority can be associated with the values for the Reference Signal Received Quality (RSRQ), Reference Signal Received Power (RSRP), Signal-to-interference Noise Ratio (SINR) and/or power headroom for a mobile device in a coverage area. In some embodiments, the predefined condition is associated with whether maximum (or near maximum) network capacity has been reached.

The request for connection re-establishment priority can be initiated based on the above-referenced values. In these cases, the likelihood of service disruption may increase (e.g., relative to coverage areas having higher SNR and ample network capacity). As such, the mobile device can be configured to automatically request connection re-establishment priority while these conditions exist (or during times and/or in coverage areas in which these conditions existed in the past).

In some embodiments, the mobile device can be configured to automatically request connection re-establishment priority based on the actual usage or travel pattern information for the mobile device or for another mobile device. For example, if the mobile device typically requires streaming service during a particular time, at or prior to such time, the mobile device can request connection re-establishment priority. As another example, service disruption may be avoided for some of the mobile devices in the coverage area based on the past mobile device use information for other mobile devices in the coverage area. As such, methods and systems herein can adaptively and proactively reduce the likelihood of service disruption.

As another example, in some embodiments, the mobile device configuration component 106 can transmit information to a mobile device to configure the mobile device to request accelerated content delivery. The request for accelerated content delivery can be a request to receive additional content (beyond that which would typically be received), which can be queued for later use by the mobile device. In this regard, the content can be queued to facilitate scheduled forced delivery of content when the coverage area has high SNR, for example. As such, the likelihood of disruption of a streaming service (should the mobile device move into a coverage area having a poor SNR), for example, can be minimized.

In some embodiments, the request for accelerated content delivery can be initiated based on predefined conditions and/or based on dynamic conditions that can be updated from time to time. In some embodiments, the predefined condition for requesting accelerated content delivery can be a moderate to high SNR in a coverage area and/or ample network resources (e.g., bandwidth, sessions, connections) being available. In these cases, the likelihood of service disruption may decrease (relative to coverage areas having poor SNR and maximum or high network capacity). As such, the mobile device can be configured to automatically request accelerated content delivery in these predefined conditions.

In various embodiments, the speed of content delivery requested can also be specified in the configuration information. In some embodiments, different tiers of speed can be requested based on the particular conditions of the coverage area (e.g., whether the SNR or a typical network resource is within a first range, a second range or a third range).

The network resource allocation information component 108 can be described in greater detail with reference to FIG. 2. One or more of the structure and/or function of the network resource allocation information component 108 can be as described with reference to the network resource allocation information component 200 (and vice versa).

Figure 2:
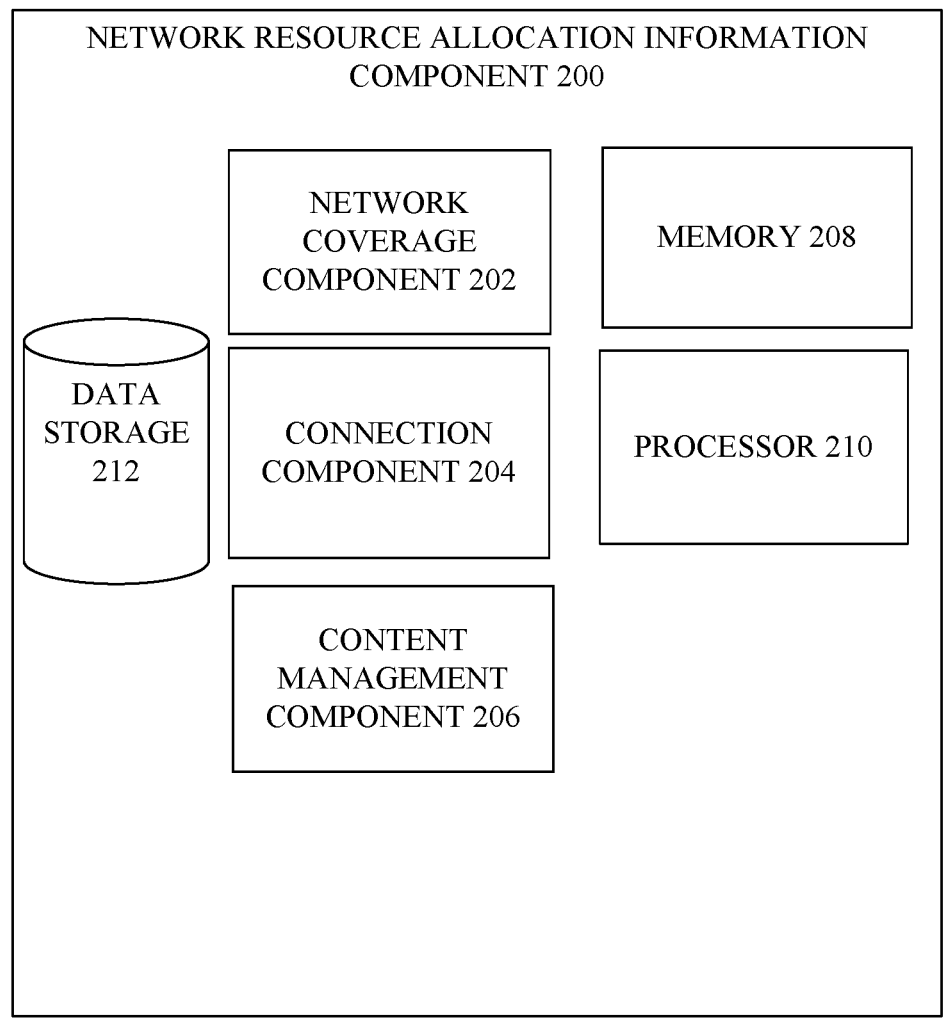
FIG. 2 illustrates an example system that facilitates connectivity and content management in accordance with embodiments described herein.

Turning to FIG. 2, the network resource allocation information component 200 can include a network coverage component 202, connection component 204, content management component 206, memory 208, processor 210 and/or data storage 212. In one or more embodiments, one or more of the network coverage component 202, connection component 204, content management component 206, memory 208, processor 210 and/or data storage 212 can be communicatively and/or electrically coupled to one another to perform one or more of the functions of the network resource allocation information component 108.

The network resource allocation information component 200 can adjust one or more network parameters (or transmit information to cause one or more network parameters to be adjusted) to modify resource allocation in the network. In various embodiments, the adjustment can be based on receipt of the request for connection re-establishment priority, based on receipt of the request for accelerated content delivery and/or based on the mobile device use information for one or more mobile devices.

In some embodiments, the network coverage component 202 can determine an amount of coverage to provide for a particular area. For example, the network coverage component 202 can adjust a network parameter to modify coverage provided to one or more mobile devices.

In some embodiments, the coverage can be extended to serve a maximum (or other number) of mobile devices, for example. In various embodiments, the coverage can be adjusted by reduction of one or more connections in the coverage area, reduction in the number of connections and/or creating one or more radio access bearer (RAB) connections.

In some embodiments, the connection component 204 can determine a number of connections to support in a coverage area. In some embodiments, the number of sessions can be adjusted based on the requests for accelerated content delivery and/or for connection re-establishment priority. For example, the number of sessions can be reduced or increased based on the receipt of a request for connection re-establishment priority or a request for accelerated content delivery, respectively.

In some embodiments, the content management component 206 can determine particular types of traffic (and a mix of the types of traffic) for which sessions will be supported. For example, the content management component 206 can determine that a number of data sessions will be reduced and a number of voice sessions will be increased. In some embodiments, the content management component 206 can make such determination based on the actual usage of the mobile devices that are active. For example, the content management component 206 can determine that a number of the mobile devices that are active typically require data-intensive service at a particular time and accordingly increase the number of data sessions during such time.

The memory 208 can be a computer-readable storage medium storing computer-executable instructions and/or information for performing the functions described herein with reference to the network resource allocation information component 200. Processor 210 can perform one or more of the functions described herein with reference to the network resource allocation information component 200. In various embodiments, the memory 208 and processor 210 need not be included in the network resource allocation information component 200 and, instead, the network resource allocation information component 200 can employ the memory 110 and/or processor 112.

Turning back to FIG. 1, the memory 110 can be a computer-readable storage medium storing computer-executable instructions and/or information for performing the functions described herein with reference to the connectivity and content management system 100. Processor 112 can perform one or more of the functions described herein with reference to the connectivity and content management system 100.

Figure 4:
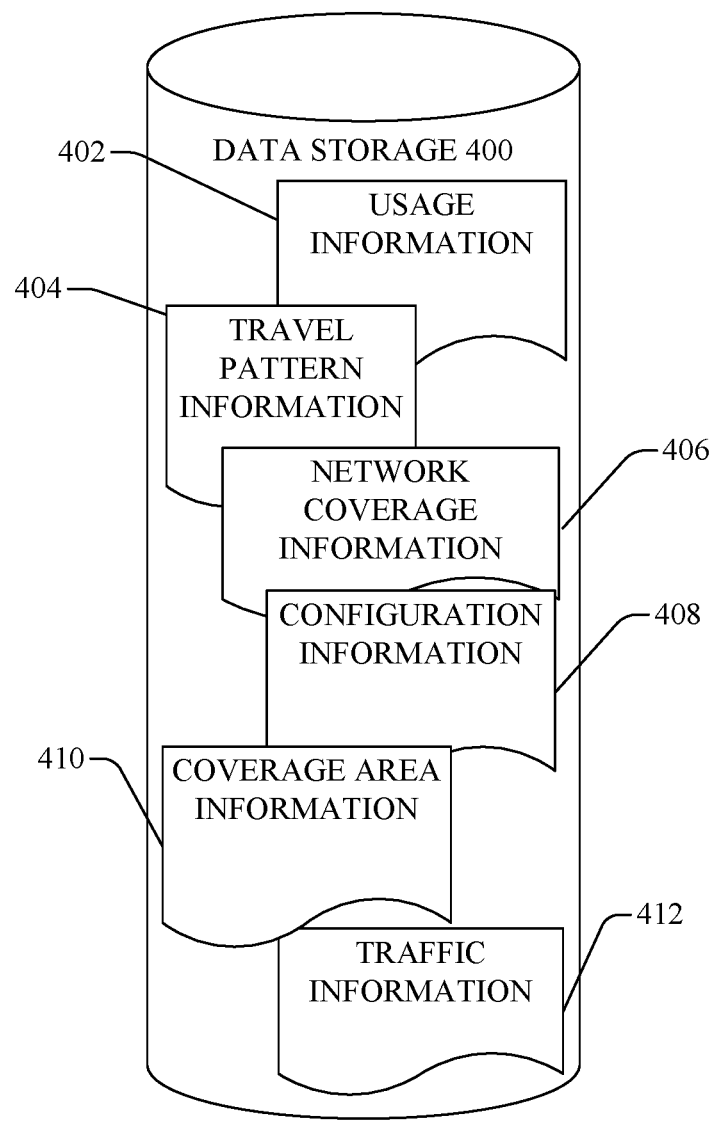
FIG. 4 illustrates an example data storage that facilitates connectivity and content management in accordance with embodiments described herein.

The data storage 114 can be configured to store information transmitted to, received by and/or processed by the connectivity and content management system 100. For example, with reference to FIGS. 1, 2 and 4, the data storage 114, 212, 400 can store usage information 402 (e.g., type of traffic, active/idle behavior, duration of activity, call drop time period, frequency, location), travel pattern information 404 (e.g., geographical locations and corresponding time of travel), network coverage information 406 (e.g., number of connections or sessions supported, quality of service information), configuration information 408 (e.g., configuration information for or based on one or more mobile devices), coverage area information 410 (e.g., signal-to-noise (SNR) and/or network capacity information, handoff information) and/or traffic information 412 (e.g., type of traffic being serviced, throughput).

Figure 3:
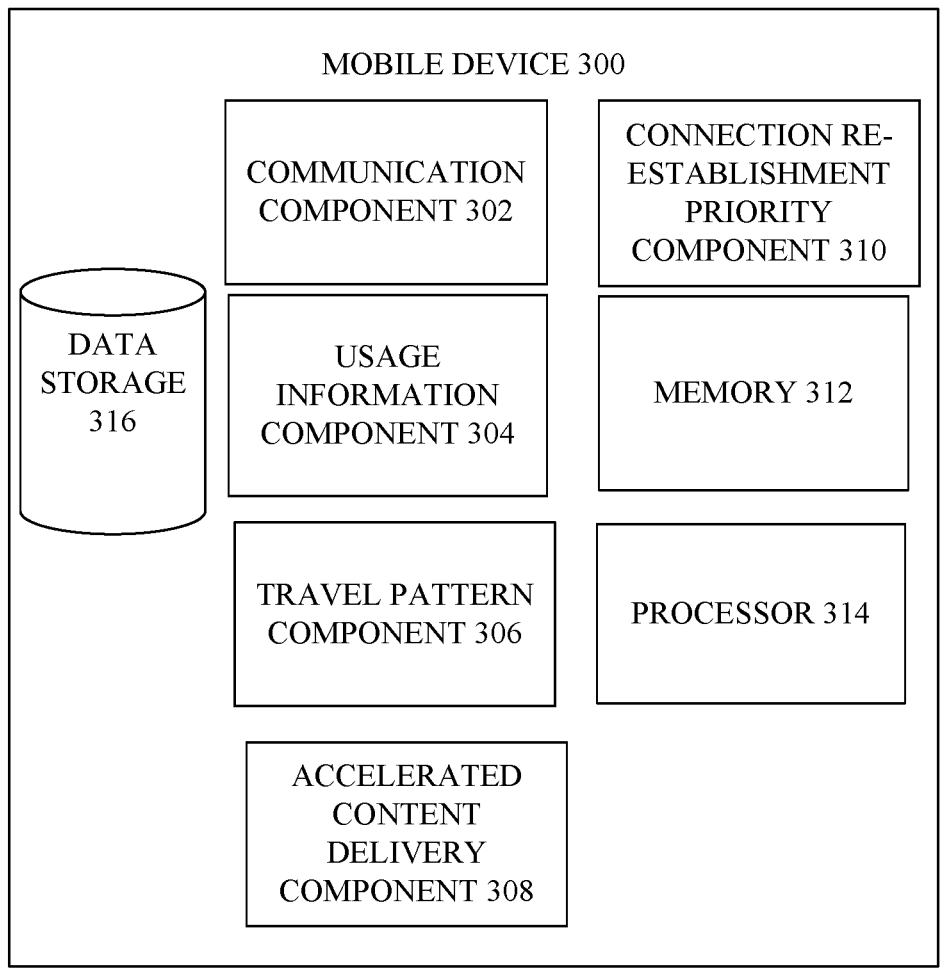
FIG. 3 illustrates an example system for which connectivity and content management is facilitated in accordance with embodiments described herein.

FIG. 3 illustrates an example system for which connectivity and content management is facilitated in accordance with embodiments described herein. The mobile device 300 can include one or more of the structure and/or functionality of the mobile devices described with reference to FIGS. 1 and 2. The mobile device 300 can include a communication component 302, usage information component 304, travel pattern component 308, accelerated content delivery component 308, connection re-establishment priority component 310, memory 312, a processor 314 and/or data storage 316. In some embodiments, one or more of the communication component 302, usage information component 304, travel pattern component 308, accelerated content delivery component 308, connection re-establishment priority component 310, memory 312, processor 314 and/or data storage 316 can be communicatively and/or electrically coupled to one another.

The communication component 302 can transmit and/or receive information to and/or from the connectivity and content management system 100. In some embodiments, the communication component 302 can transmit and/or receive information to and/or from the network resource allocation information component (e.g., network resource allocation information component 108, 200). The information can include, but is not limited to, actual travel usage, travel pattern information, configuration information or the like.

The usage information component 304 can determine and/or store mobile device use information for the mobile device 300 (or for other mobile devices within the same or nearby coverage area). In some embodiments, the usage information component 304 can determine mobile device use information indicative of past or current actual usage or travel pattern information for the mobile device 300. The travel pattern component 306 can determine and/or store mobile device use information indicative of geographical locations traversed and corresponding time of travel for mobile device 300. The mobile device use information can be transmitted to the connectivity and content management system 100 and/or network resource allocation information component 108, 200 in some embodiments.

The accelerated content delivery component 308 can store configuration information (or process information received for configuring the mobile device 300) to cause the mobile device 300 to request accelerated content delivery upon the occurrence of predefined (or, in some embodiments, dynamically-defined) conditions as discussed in greater detail with reference to FIGS. 1 and 2. In some embodiments, the accelerated content delivery component 308 can store information including, but not limited to, one or more predefined conditions during which the mobile device 300 will automatically request accelerated content delivery.

The connection re-establishment priority component 310 can store configuration information (or process information received for configuring the mobile device 300) to cause the mobile device 300 to request connection re-establishment priority upon the occurrence of predefined (or, in some embodiments, dynamically-defined) conditions as discussed in greater detail with reference to FIGS. 1 and 2. In some embodiments, the connection re-establishment priority component 310 can store information including, but not limited to, one or more predefined conditions during which the mobile device 300 will automatically request connection re-establishment priority.

The memory 312 can be a computer-readable storage medium storing computer-executable instructions and/or information for performing the functions described herein with reference to the mobile device 300. Processor 314 can perform one or more of the functions described herein with reference to the mobile device 300.

The data storage 316 can be configured to store information transmitted to, received by and/or processed by the mobile device 300. For example, with reference to FIG. 4, the data storage 316 can store usage information 402 (e.g., type of traffic, active/idle behavior, duration of activity, call drop time period, frequency, location), travel pattern information 404 (e.g., geographical locations and corresponding time of travel) and/or configuration information 408 (e.g., configuration information for or based on one or more mobile devices) for the mobile device 300 (or for other mobile devices).

FIGS. 5-9 illustrate example flowcharts of methods that facilitate processing for connectivity and/or content management in accordance with embodiments described herein.

Figure 5:
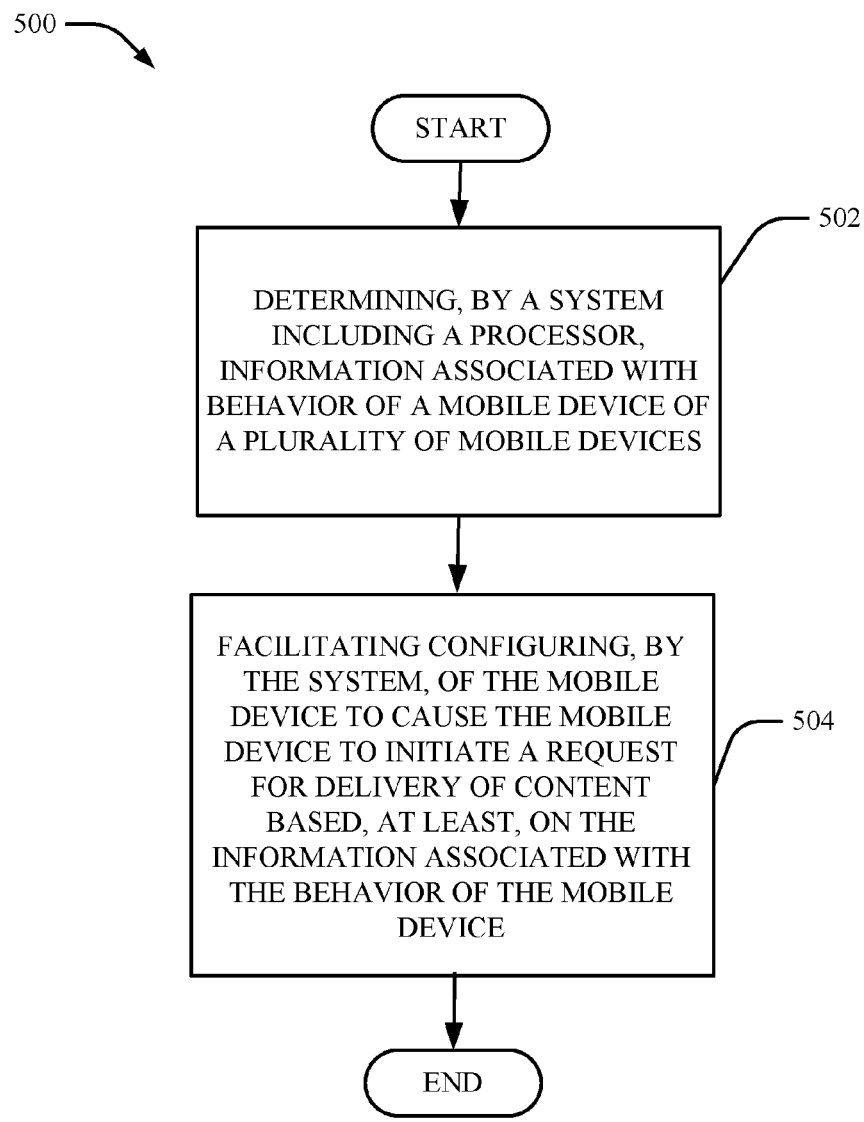
FIGS. 5-9 illustrate example flowcharts of methods that facilitate connectivity and content management in accordance with embodiments described herein.

Turning first to FIG. 5, at 502, method 500 can include determining information associated with the behavior of a mobile device. The information can be mobile device use information in some embodiments. The mobile device use information can be stored in the mobile device that is configured, other mobile devices within a particular geographic proximity to the mobile device or the connectivity and content management system (e.g., the connectivity and content management system 100 of FIG. 1).

Mobile device use information can include, but is not limited to, past or current actual usage of the mobile device and/or a past or current travel pattern of the mobile device. For example, the past or current actual usage of the mobile device can be determined (and/or stored). By way of example, but not limitation, the type of media transmitted from or received at the mobile device, call drop frequency, time or locations, and/or the time interval during which the mobile device is active or idle can be determined and/or stored.

For example, a determination can be made that mobile device A was active from 5:30-6:30 p.m. and 7:30-9:30 p.m. Monday through Friday, and was idle 9:30 p.m.-6:30 a.m. Monday through Friday. As another example, a determination can be made that mobile device A was engaged in voice communications from 5:30-6:30 p.m. Monday through Friday and was downloading videos from 7:30-9:30 p.m. Monday through Friday. As yet another example, a determination can be made that mobile device A typically experiences a call drop at 5:45 p.m. on Fridays.

As another example, the past or current travel patterns of the mobile device can be determined (and/or stored). By way of example, but not limitation, geographical locations, paths traversed by the mobile device and/or coverage areas having poor network capacity and/or low SNR traversed by the mobile device can be determined and/or stored. For example, a determination can be made that mobile device A travels from, or is traveling from, point A to point B.

In some embodiments, the frequency or time intervals during which the mobile device travels can be determined and/or stored. For example, mobile device A traveled from point A to point B along Highway X three times in the past week can be determined and/or stored. As another example, mobile device A traveled from point A to point B from 5:30 p.m. to 6:30 p.m. five times in the past week can be determined and/or stored.

In various embodiments, the travel pattern can be stored in the mobile device and/or in the system. The determination can be performed by the system, such as the connectivity and content management system 100 described with reference to FIG. 1.

At 504, method 500 can include facilitating configuring of the mobile device to cause the mobile device to initiate a request for delivery of content. The request can be based on the information associated with the mobile device. In some embodiments, the mobile device can be configured in association with delivery of content based on the location of the mobile device.

For example, in some embodiments, the mobile device can be configured to request accelerated content delivery based on the past or current actual usage of the mobile device and/or based on the travel pattern of the mobile device. In some embodiments, for example, the past or current actual usage by the mobile device can indicate that at a particular time, the mobile device is typically engaged in a data-intensive application (e.g., video download or internet browsing). Accordingly, the system can increase network resources for the mobile device prior to or during the time of the downloading/browsing activity when the mobile device is in a coverage area with a predefined level of one or more network resources (e.g., bandwidth) and/or a predefined level of SNR. Additional video/data can be queued while the mobile device is in the particular area having the predefined level of one or more network resources (e.g., bandwidth) and/or a predefined level of SNR. Accordingly, when the mobile device is in a coverage area having less desirable network resources or SNR, the service being provided to the mobile device can continue to the mobile device with less likelihood of being interrupted because the video/data has been queued while the mobile device was in a more desirable coverage area.

As another example, in some embodiments, in lieu of being configured to request accelerated content delivery, the mobile device can be configured to request connection re-establishment priority based on the past or current actual usage of the mobile device and/or based on the travel pattern of the mobile device. For example, based on actual usage, call drop patterns/frequency can be employed to determine coverage areas in which a mobile device should transmit a request for connection re-establishment priority. As another example, the mobile device can request connection re-establishment priority when the mobile device is approaching or traveling through an area having low SNR and/or a handoff area. In other embodiments, the mobile device can request connection re-establishment priority when the mobile device is approaching or traveling through an area in which the mobile device is likely to experience an interruption in service (or an area in which the mobile device has experienced interruptions in service in the past).

While the embodiments described above detail embodiments of configuring the mobile device based on mobile device use information, in some embodiments, the mobile device can be configured based on any number of other different scenarios. For example, the mobile device can be configured to request accelerated content delivery and/or to request connection re-establishment priority based on the past or current actual usage or travel patterns of other mobile devices (e.g., other mobile devices within a geographic proximity to the mobile device). In some embodiments, for example, the actual usage or travel pattern of one or more other mobile devices can indicate a coverage area that has poor SNR and within which numerous service interruptions are experienced. Based on the mobile device use information for these mobile devices (e.g., mobile devices B and C), the systems described herein can configure the mobile device (e.g., mobile device A) to request accelerated content delivery and/or or to request connection re-establishment priority.

As another example, the mobile device can be configured to request accelerated content delivery and/or to request connection re-establishment priority based on the characteristics of one or more coverage areas (e.g., network capacity and/or SNR of the coverage areas that the mobile device has traveled through or is currently traveling through). For example, in some embodiments, a mobile device can be configured to request accelerated content delivery and/or to request connection re-establishment priority based on past or current information about the SNR and/or capacity of the network.

In some embodiments, the network can be adjusted based on the mobile device use information as described in further detail with reference to FIGS. 6 and 7.

Figure 6:
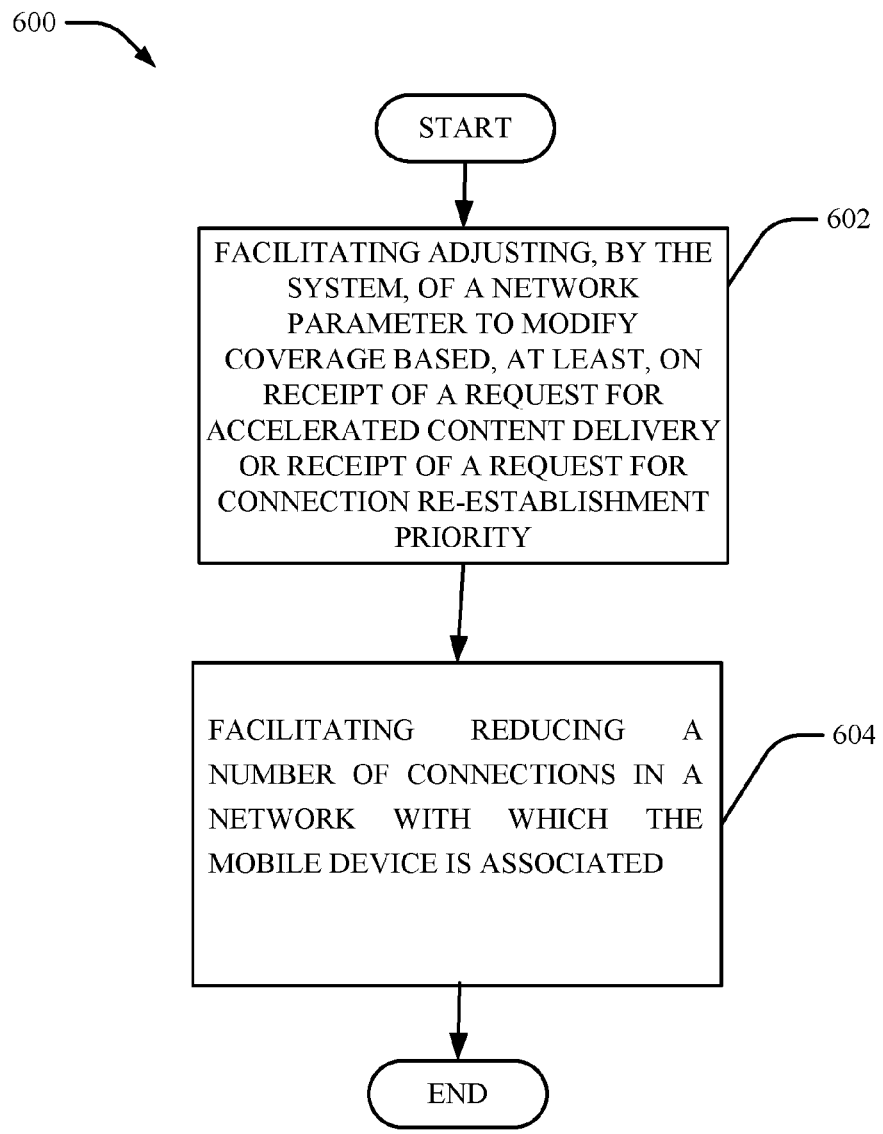

Turning first to FIG. 6, at 602, method 600 can include facilitating adjusting of a network parameter to modify coverage provided to one or more mobile devices. In some embodiments, the coverage can be modified based on receipt of a request for accelerated content delivery or receipt of a request for connection re-establishment priority.

For example, the system can adjust the network to extend coverage for a particular number (or, in some cases, for a maximum number) of users. The coverage can be adjusted by reduction or RAB one or more connections in the coverage area and/or reduction in the number of connections. In some embodiments, the number and/or type of sessions can be adjusted based on the requests for accelerated content delivery and/or for connection re-establishment priority. For example, the number of data sessions can be reduced, the number of voice sessions that can be supported can be increased, etc.

At 604, method 600 can include facilitating reducing a number of connections in a network with which the mobile device is associated. The reduction can be based on the request for accelerated content delivery and/or based on the request for connection re-establishment priority in various embodiments.

Figure 7:
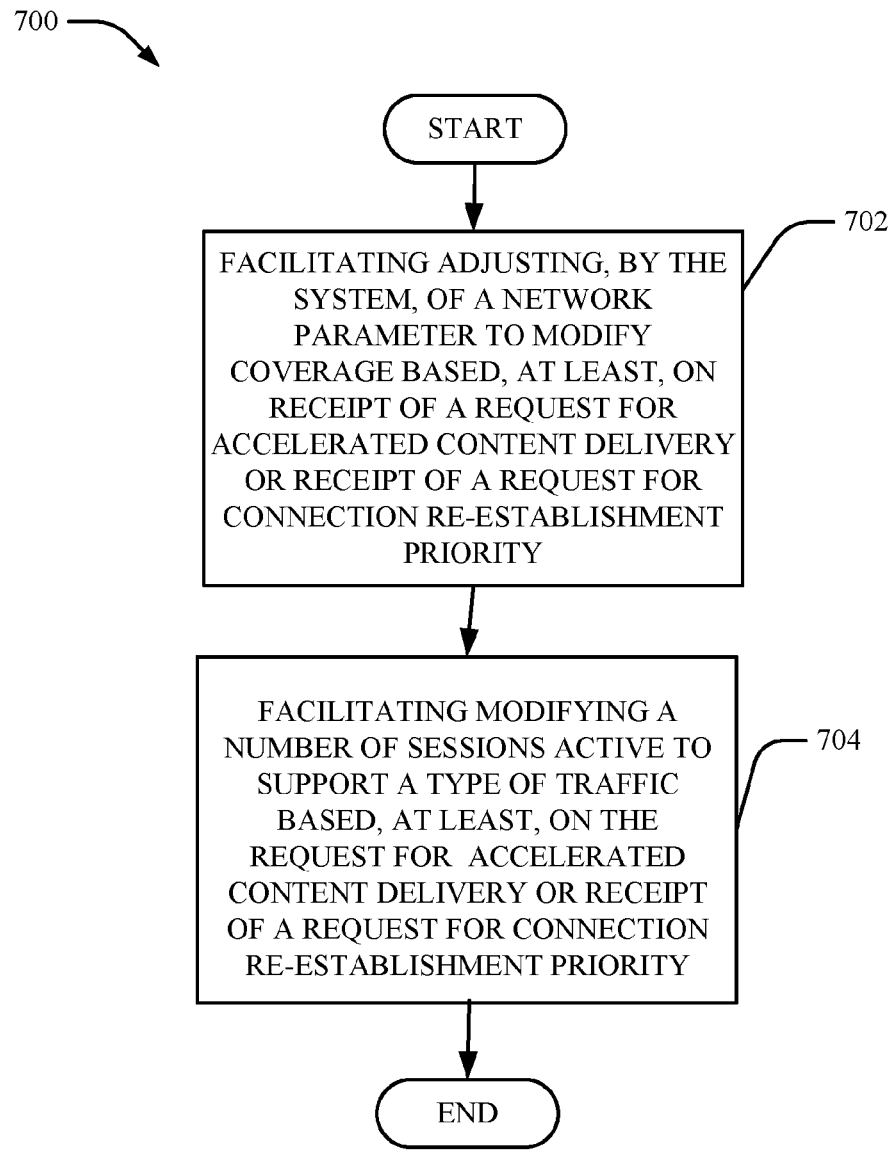

Turning now to FIG. 7, at 702, method 700 can include facilitating adjusting of a network parameter to modify coverage provided to one or more mobile devices. For example, coverage can be extended to a particular number (e.g., a maximum number) of mobile devices in the network by adjusting the network parameter. The coverage can be extended for a predefined amount of time or for a predefined time interval.

For example, upon receipt of the request for connection re-establishment priority, the system can extend network coverage to provide connections for the maximum number of users in order to reduce the likelihood of interruption in service and a corresponding connection re-establishment request.

As described with reference to FIG. 6, the system can adjust the network to extend coverage for a particular number (or, in some cases, for a maximum number) of users. The coverage can be adjusted by reduction of one or more connections in the coverage area, reduction in the number of connections and/or creating RAB connections. In some embodiments, the number and/or type of sessions can be adjusted based on the requests for accelerated content delivery and/or for connection re-establishment priority. For example, the number of data sessions can be reduced, the number of voice sessions that can be supported can be increased, etc.

At 704, method 700 can include facilitating modifying a number of sessions active in the coverage area to support a particular type of traffic. The modification can be based on the request for accelerated content delivery and/or based on the request for connection re-establishment priority in various embodiments.

For example, in some embodiments, the network parameter can be indicative of a number or type of sessions that are supported in a coverage area. For example, the network parameter can be indicative of a number of data sessions or voice sessions that are supported in a coverage area, for example. In some embodiments, the network parameter can be indicative of a number of connections and/or an amount of RAB to each connection in the coverage area.

Figure 8:
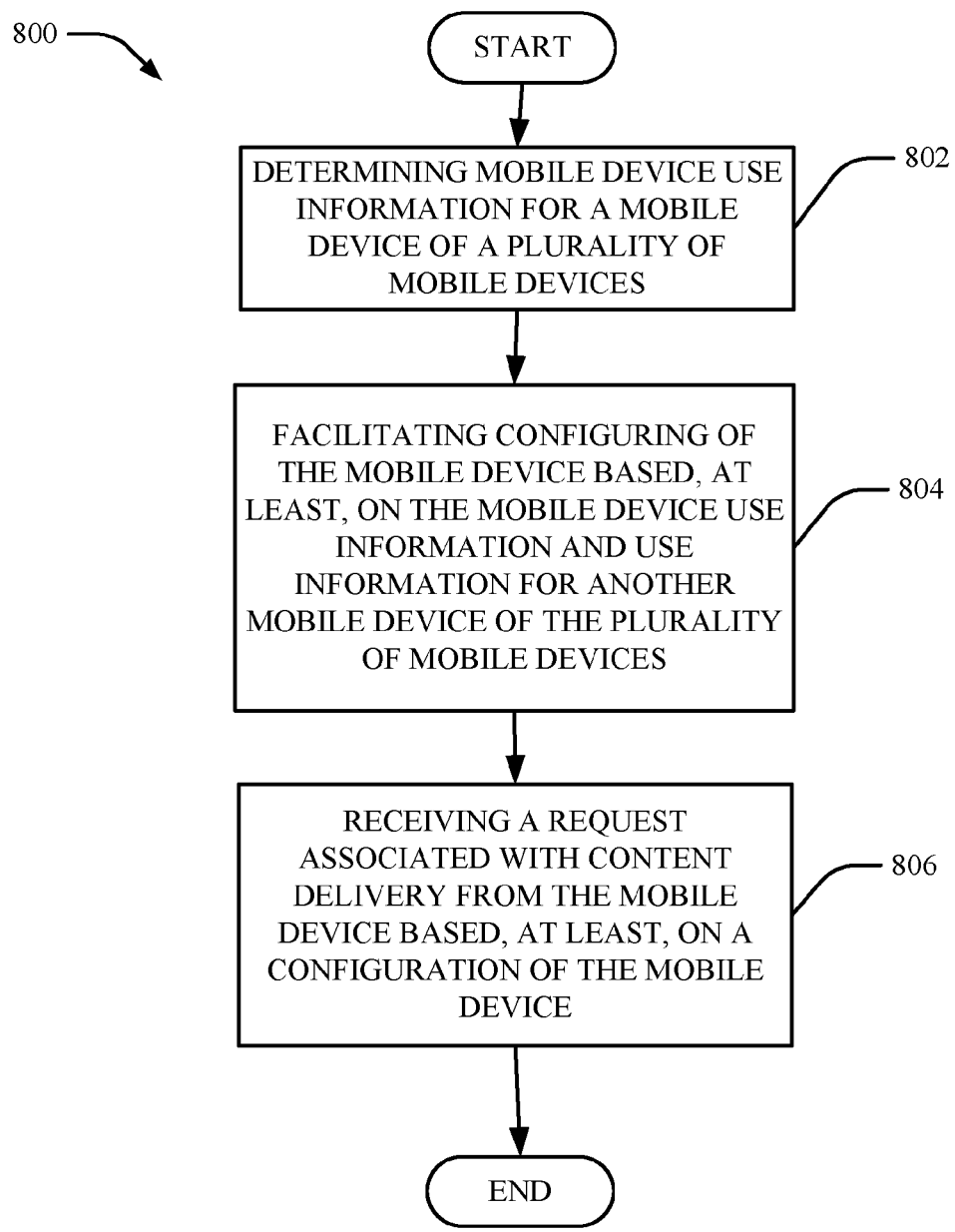

Turning to FIG. 8, at 802, method 800 can include determining mobile device use information for a mobile device of a plurality of mobile devices. At 804, method 800 can include facilitating configuring of the mobile device based, at least, on the mobile device use information and use information for another mobile device of the plurality of mobile devices. At 806, method 800 can include receiving a request associated with content delivery from the mobile device based, at least, on a configuration of the mobile device.

Figure 9:
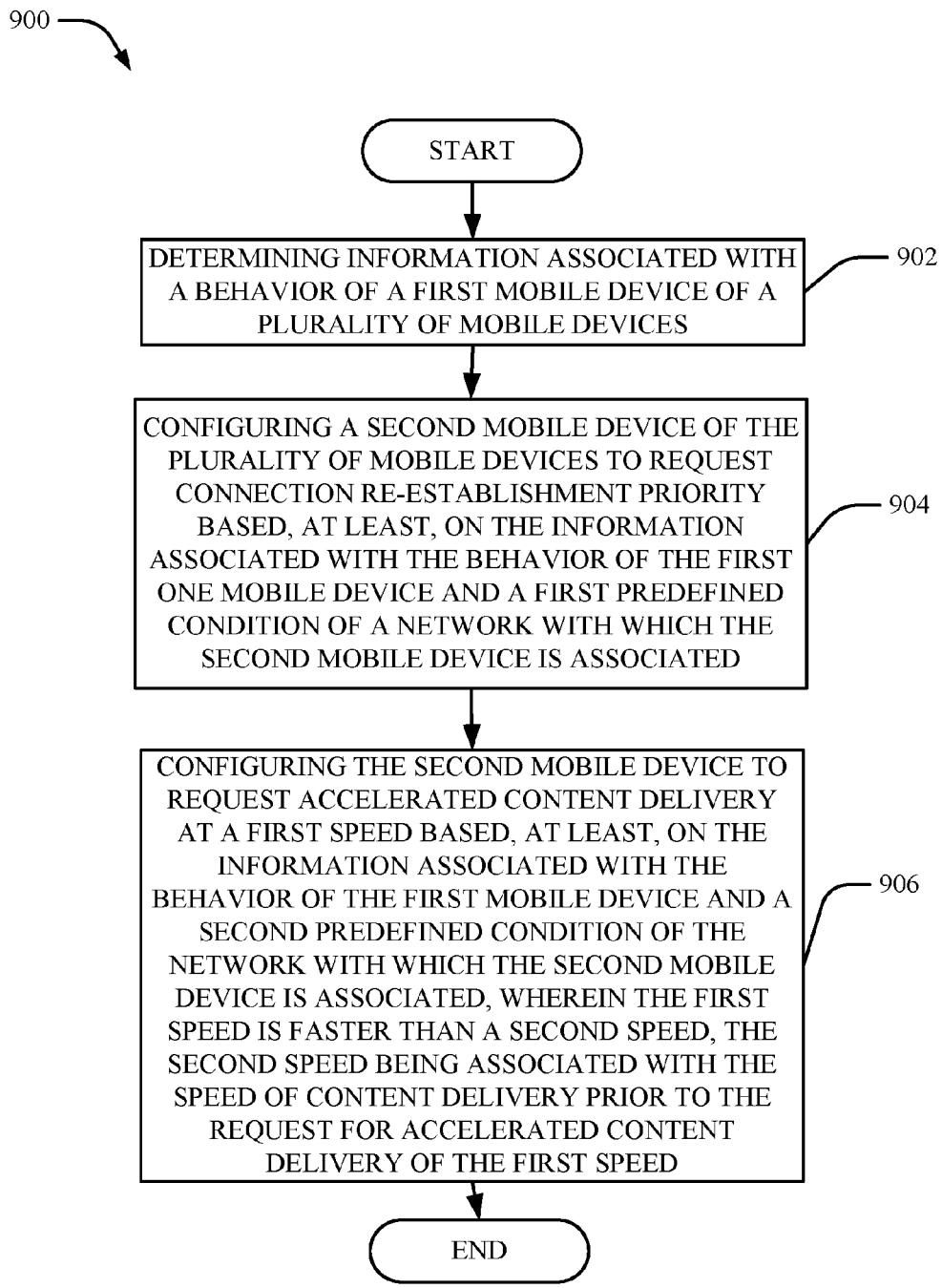

Turning now to FIG. 9, at 902, method 900 can include determining information associated with a behavior of a first mobile device of a plurality of mobile devices. In various embodiments, the behavior can include the past or current actual usage or travel patterns of the mobile device, service disruption information, connection re-establishment request information and the like. Although not shown, in some embodiments, the past or current actual usage or travel patterns of the mobile device, service disruption information and/or connection re-establishment request information can also be determined for one or more other mobile devices.

At 904, method 900 can include configuring a second mobile device of the plurality of mobile devices to request connection re-establishment priority. The request for connection re-establishment can be based on the information associated with the behavior of the first one mobile device and a particular condition of a network with which the second mobile device is associated. At 906, method 900 can include configuring the second mobile device to request accelerated content delivery at a first speed based, at least, on the information associated with the behavior of the first mobile device and a second predefined condition of the network with which the second mobile device is associated. In some embodiments, the first speed can be faster than the speed of content delivery prior to the mobile device sending the request for the accelerated content delivery.

For example, service interruption information (e.g., time and location of service interruption, type of media transmitted or received during service interruption) can be determined for the first mobile device based on the past or current actual usage or travel pattern of the first mobile device. A determination can be made that the second mobile device has at least one aspect of actual usage or travel pattern that is the same as or similar to the actual usage or travel pattern of the first mobile device. As such, the second mobile device can be configured to transmit particular requests (e.g., request for connection re-establishment priority or request for accelerated content delivery) based on the time, location, etc. of the service disruption with the first mobile device.

For example, if service disruption occurs with a particular frequency for coverage area A between 5:30-6:30 p.m. for the first mobile device, the second mobile device can be configured to transmit a request for connection re-establishment priority upon approaching or traveling through coverage area A during the 5:30-6:30 p.m. time period.

While one or more of the embodiments described can adjust a number of a type of traffic session based on the above-referenced factors, in various embodiments, the embodiments described herein can be media-agnostic and the systems and methods can perform the operations described without regard to the type of media being transmitted or received in some embodiments. The types of media can include, but are not limited to, video, audio, a file transfer, voice content or any number of other different types of media that can be transmitted and/or received over a wireless channel.

Figure 10:
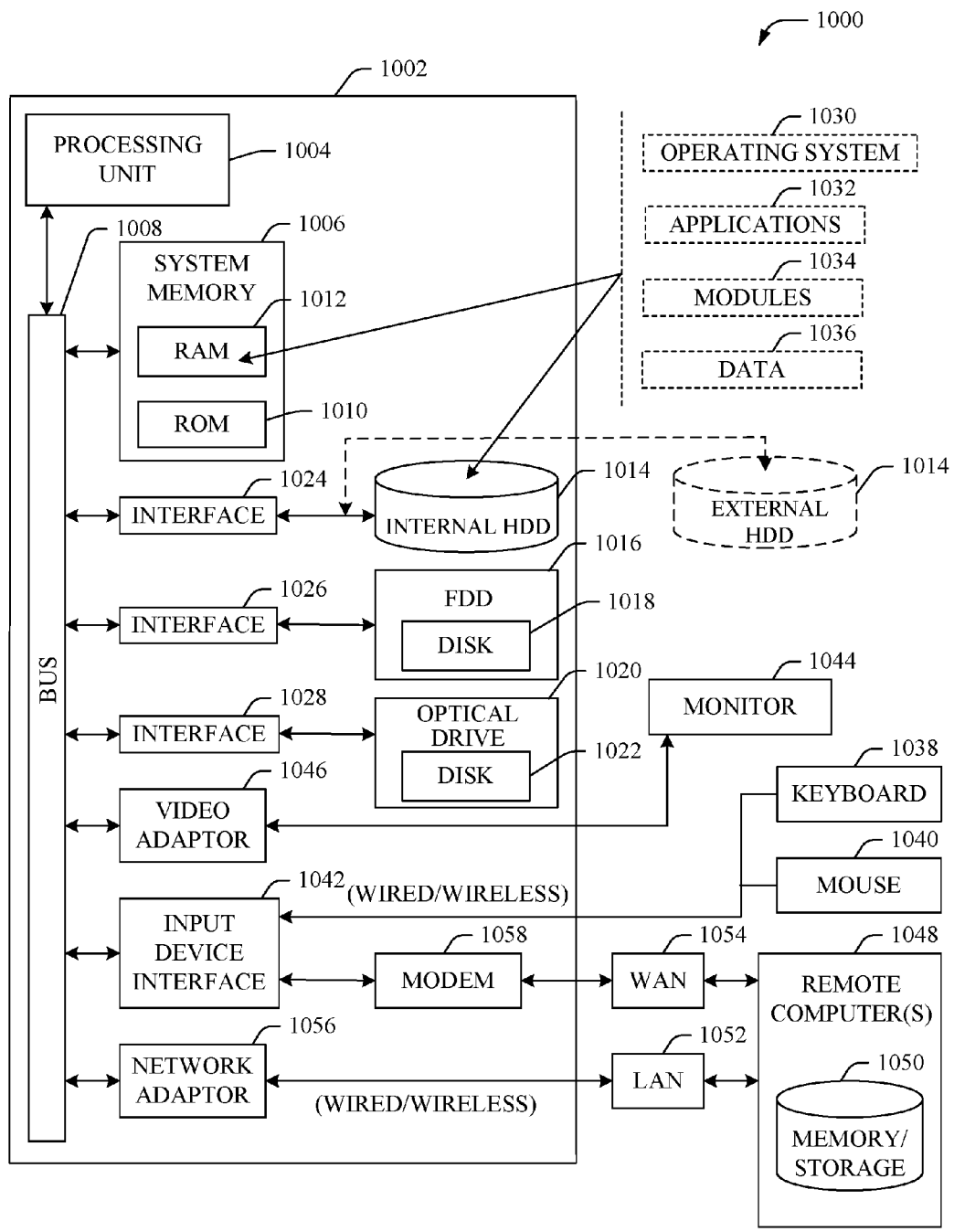
FIG. 10 illustrates a block diagram of a computer operable to facilitate connectivity and content management in accordance with embodiments described herein.

Referring now to FIG. 10, there is illustrated a block diagram of a computer operable to facilitate connectivity and/or content management. For example, in some embodiments, the computer can be or be included within the system 100.

In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
facilitating, by a system comprising a processor, a first configuration of a mobile device of mobile devices to cause the mobile device to initiate a request for delivery of content based on a behavior of the mobile device; and
facilitating, by the system, a second configuration of the mobile device to cause the mobile device to request a priority for re-establishment of a disconnected connection of the mobile device, wherein the request for the priority is transmitted based on power information for the mobile device.

2. The method of claim 1, wherein the behavior of the mobile device is characterized by mobile device use information representative of usage of the mobile device.

3. The method of claim 2, wherein the mobile device use information comprises a past travel pattern information of the mobile device.

4. The method of claim 1, wherein the power information comprises information indicative of a difference between a defined output power for the mobile device and an estimated uplink transmission power for the mobile device.

5. The method of claim 1, wherein the facilitating the first configuration comprises facilitating the first configuration of the mobile device to request a first type of content delivery of types of content delivery based on a location of the mobile device being determined to be within a coverage area satisfying a defined condition, and wherein the first type of content delivery is content delivery at a defined speed.

6. The method of claim 5, wherein the facilitating the first configuration further comprises facilitating the first configuration of the mobile device to request an accelerated content delivery based on mobile device use information representative of usage of the mobile device.

7. The method of claim 1, further comprising:
facilitating, by the system, adjusting of a network parameter to modify the coverage area based on receipt of the request for the priority for the re-establishment of the disconnected connection of the mobile device.

8. The method of claim 7, wherein the request for the priority is further transmitted based on a determination that a level of a signal-to-noise ratio measured for the coverage area is below a defined value.

9. The method of claim 7, wherein the facilitating the adjusting comprises facilitating the adjusting of the network parameter to extend the coverage area for a defined number of the mobile devices for a defined amount of time.

10. The method of claim 7, wherein the facilitating the adjusting comprises facilitating reducing a number of connections between network devices of a network to which the mobile device is configured to connect.

11. The method of claim 7, wherein the facilitating the adjusting comprises facilitating the adjusting of the network parameter to modify a number of active sessions being handled by network devices of a network to which the mobile device is configured to connect in order to support a type of traffic received by the mobile device.

12. The method of claim 11, wherein the type of traffic comprises at least one of video, audio, a file transfer or voice.

13. The method of claim 1, wherein the facilitating the first configuration comprises facilitating the configuration of the mobile device to request the priority for the re-establishment of the disconnected connection of the mobile device based on a location of the mobile device being determined to be within a coverage area determined to satisfy a defined condition.

14. The method of claim 1, wherein the facilitating the first configuration further comprises facilitating the first configuration of the mobile device to request the priority for the re-establishment of the disconnected connection of the mobile device based on mobile device use information representative of usage of the mobile device.

15. The method of claim 1, further comprising:
facilitating, by the system, storing of information associated with the behavior of the mobile device in a storage of the mobile device.

16. A non-transitory machine-readable storage medium, comprising executable instructions that, when executed by a processor, facilitate performance of operations, comprising:
facilitating generation of a configuration of a first mobile device of mobile devices in response to a determination of mobile device use information for a second mobile device of the mobile devices; and
receiving, from the first mobile device, a request associated with content delivery based on the configuration of the first mobile device, a past signal strength of an area of a coverage area and a prediction that the first mobile device will traverse the area at a future time, wherein the prediction is based on an evaluation of a past pattern of travel of the first mobile device.

17. The non-transitory machine-readable storage medium of claim 16, wherein the mobile device use information comprises current travel pattern information of the first mobile device.

18. The non-transitory machine-readable storage medium of claim 16, wherein the request associated with the content delivery comprises a request for the content delivery of a defined speed based on the mobile device use information and network information representing a condition of a network with which the first mobile device is associated, and wherein the content delivery of the defined speed is an accelerated delivery relative to a speed of the content delivery prior to the request.

19. A system, comprising:
a processor; and
a memory that stores executable instructions that, when executed by the processor, facilitate performance of operations, comprising:
configuring a second mobile device of the mobile devices to request a priority for re-establishment of a disconnected connection of the second mobile device, wherein initiation of the request is based on an activity of a first mobile device of mobile devices and power information for the second mobile device; and
configuring the second mobile device to request an accelerated content delivery at a specified speed based on the activity of the first mobile device and a condition of network devices of a network with which the second mobile device is associated.

20. The system of claim 19, wherein the activity of the first mobile device comprises a past travel pattern of the first mobile device, and wherein the power information comprises information indicative of a difference between a maximum output power for the second mobile device and an estimated uplink transmission power for the second mobile device.

* * * * *